United States Patent [19]

Berg

[11] Patent Number: 4,708,749
[45] Date of Patent: Nov. 24, 1987

[54] METHOD OF CALIBRATING VEHICLE WHEELS TO A FINISHED SIZE

[75] Inventor: Otto Berg, Asker, Norway

[73] Assignee: Ardal OG Sunndal Verk A.S., Oslo, Norway

[21] Appl. No.: 802,218

[22] Filed: Nov. 26, 1985

[30] Foreign Application Priority Data

Nov. 27, 1984 [DE] Fed. Rep. of Germany ....... 3443207

[51] Int. Cl.⁴ .............................................. C22F 1/04
[52] U.S. Cl. ......................... 148/11.5 A; 148/12.7 A
[58] Field of Search .................... 148/11.5 A, 12.7 A, 148/2

[56] References Cited

U.S. PATENT DOCUMENTS 3,172,787  3/1965  Martenet ........................ 148/11.5 A Primary Examiner—R. Dean
Attorney, Agent, or Firm—Wenderoth, Lind & Ponack

[57] ABSTRACT

The desired finished size of the rim of an aluminum wheel which has undergone a solution heat treatment is calibrated by positioning the wheel, at a first temperature substantially equal to the temperature of the wheel after removal thereof from the solution heat treatment, in a die. The die is heated to a second temperature lower than the first temperature. The wheel is cooled to a third temperature lower than the second temperature, such that the rim is caused to shrink tightly over the die to the desired finished size. The cooling is interrupted such that the rim is heated by heat from the die and thereby is expanded by an amount sufficient to enable the rim to be removed easily from the die.

6 Claims, 1 Drawing Figure

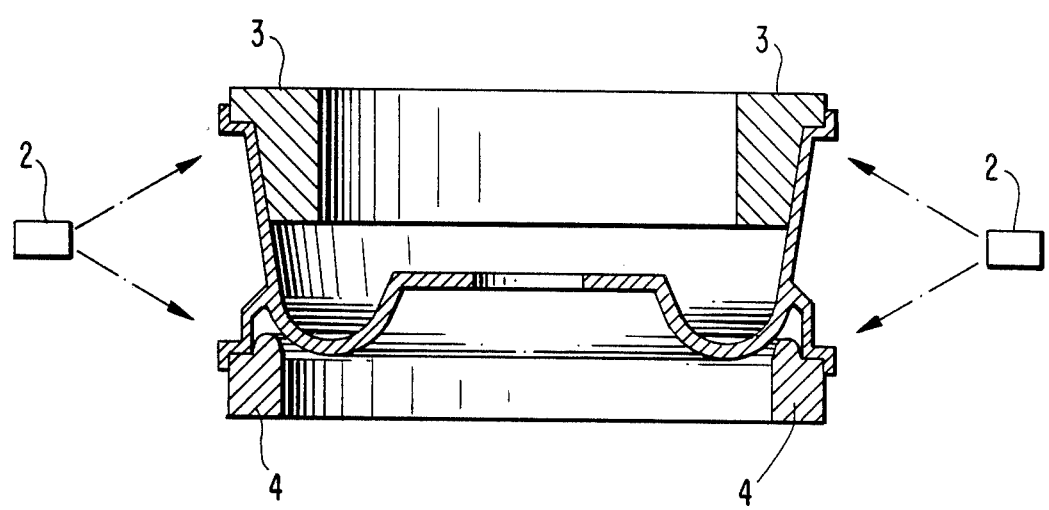

METHOD OF CALIBRATING VEHICLE WHEELS TO A FINISHED SIZE

BACKGROUND OF THE INVENTION

The present invention relates to a method of calibrating to a predetermined finished size vehicle wheels made of a heat-treatable aluminum sheet by means of one or more dies. As employed herein, the term "aluminum" refers to aluminum for aluminum alloys normally employed for forming wheels.

Vehicle wheels for pneumatic tires are manufactured primarily of steel and in the form of a compound unit consisting of a wheel disk and a rim. The wheel must meet certain conditions with regard to the diameter, circumference, width, depth, and alignment of the rim. After the rim has been formed by rolling, it is fitted onto the wheel disk. Usually, this is accomplished with an expansion die, or alternatively, first with an expansion die which expands the rim further than the required size, and then by compression strain, whereby the rim is pressed onto the wheel disk.

This method is less suitable for wheels made of a single piece, e.g., cast or forged aluminum wheels, especially since these wheels are already manufactured with smaller tolerances in terms of roundness compared to conventional steel wheels. Therefore, the rims of cast or forged aluminum wheels are frequently cut down to the exact circumferential dimension required to maintain the relatively close tolerances.

In the manufacture of single-piece aluminum wheels by effecting a pressing thereof, it is desirable to preserve the rim in the form in which it was pressed, that is, without cutting down to the exact circumferential dimension required. For this, cost considerations are, on the one hand, an essential criterion, but on the other hand, also much is to be said for the advantageous properties of the metal on the surface produced by pressing. Pressing results in a very uniform distribution of the worked material in the rim and in an extraordinary roundness, which means only a slight imbalance. However, subsequent heat treatment, e.g., in the form of solution heat treatment for the homogenization of the texture of the worked material, can alter the correct dimensional form, so that it is necessary not to calibrate the wheel to the desired finished size until after the solution heat treatment. Such a method is taught by U.S. Pat. No. 3,172,787 in connection with a rim having a welded seam.

SUMMARY OF THE INVENTION

According to the invention, the method step involving the solution heat treatment that precedes the calibration of the rim to the desired finished size can be utilized for calibrating the rim to the desired finished size by placing the wheel over a die while the wheel is cooled down from the temperature of the solution heat treatment. This results in a uniform deformation in the rim. The rim assumes the diameter and the configuration of the die within very close tolerances.

Since the rim shrinks onto the die, a considerable force is required to remove the wheel therefrom. A known and customary solution to this problem is to build such dies in sections that can be moved radially in order to remove the work piece.

However, such dies are expensive and complicated to handle. The present invention has as its object the provision of a simple method of calibrating vehicle wheels to the desired finished size in which the above disadvantages are obviated.

The method of the invention provides the advantage that simple dies can be employed.

BRIEF DESCRIPTION OF THE DRAWINGS

An embodiment of the invention will be described with reference to the accompanying drawing, wherein:

The single FIGURE is a section through a wheel formed according to the invention.

DETAILED DESCRIPTION OF THE INVENTION

A work piece 1 being formed, i.e. a wheel, has a cooling medium, normally water, sprayed thereon by means of nozzles 2. Corresponding parts of a die are designated 3 and 4.

Such wheels 1 are manufactured by pressing a sheet of heat-treatable aluminum alloy that has a size slightly below that of the final diameter. At the end of a subsequent solution heat treatment, such formed wheel is placed in the heated dies 3 and 4 at approximately the same temperature, and the cooling medium then cools the wheel to a certain temperature below that of the dies 3 and 4. This causes the rim of the wheel 1 to shrink firmly onto the dies 3 and 4.

For example, the wheel 1 can have a size $5\frac{1}{2}''$ J×15" and be subjected to a solution heat treatment at a temperature of 500° to 550° C. In practice, a preheating temperature of the dies of 100° has proven effective. As mentioned above, the spraying with cold water causes the rim of the wheel 1 to shrink onto the dies 3 and 4, resulting in the rim being formed to an exact desired diameter. Within 10 seconds, the wheel temperature drops from 550° C. to room temperature. The water supply is then turned off. The heated dies 3 and 4 then radiate heat to the rim, which expands again. After 20 seconds, the wheel 1 is loose and can be removed from the dies 3 and 4.

Due to the excellent heat conductivity of aluminum, it is possible to cool the rim to a temperature corresponding approximately to that of the cooling medium. Because the dies 3 and 4 are maintained at a slightly higher temperature even after the completion of the cooling process, heat flows from the dies 3 and 4 to the work piece after the latter cools down, thus causing the work piece to expand slightly. The temperature rise in the wheel 1 caused by the heating of the dies 3 and 4 must be at least high enough to produce a thermal expansion of the wheel 1 corresponding to the stress caused by the shrinkage. In practice, this requires a temperature rise of from 50° to 60° C. The work piece is then sufficiently expanded so that it can be removed from the dies 3 and 4 without requiring additional forces. In this way, the calibrated shape is kept unaffected by external influences. It is important that the dies 3 and 4 maintain an even temperature in order to ensure uniformity of reproduction from wheel to wheel.

I claim:

1. A method of calibrating to a desired finished size the rim of an aluminum wheel which has undergone a solution heat treatment, said method comprising:

positioning said wheel, at a first temperature substantially equal to the temperature of the wheel after removal thereof from said solution heat treatment, in a die;

heating said die to a second temperature lower than said first temperature;

cooling said wheel to a third temperature lower than said second temperature, and thereby causing said rim to shrink tightly over said die to said desired finished size; and interrupting said cooling such that said rim is heated by heat from said die and thereby is expanded by an amount sufficient to remove said rim from said die.

2. A method as claimed in claim 1, wherein said cooling comprises spraying a cooling medium onto said rim.

3. A method as claimed in claim 2, wherein said cooling medium comprises water.

4. A method as claimed in claim 1, wherein said heating of said rim by said heat from said die is sufficient to overcome stress imparted to said rim during said shrinking.

5. A method as claimed in claim 1, wherein said first temperature is approximately 500° to 550° C., said second temperature is approximately 100° C., and said heating of said rim by said heat from said die raises the temperature of said rim above said third temperature by approximately 50° to 60° C.

6. A method as claimed in claim 1, wherein said wheel is cast or forged.

* * * * *